(12) United States Patent
Banas et al.

(10) Patent No.: US 6,353,619 B1
(45) Date of Patent: Mar. 5, 2002

(54) CIRCUIT TO INTEGRATE A HOST PROCESSOR WITH SPECIAL PACKET-HANDLING LOGIC FOR USE WITH A DSL MODEM

(75) Inventors: Kenneth Banas, Dunedin; Michael Kowalski, Palm Harbor; David Sams, Safety Harbor; Ron Wilcox, Largo; Teresa Sperry, Clearwater; Tim McGrath, St. Petersburg, all of FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/023,513

(22) Filed: Feb. 13, 1998

(51) Int. Cl.[7] .............................................. H04L 12/413
(52) U.S. Cl. ....................................... 370/463; 370/419
(58) Field of Search .................................. 370/420, 419, 370/463, 484, 487, 494, 445; 375/222, 260

(56) References Cited

U.S. PATENT DOCUMENTS

| 5,883,907 A | * | 3/1999 | Hoekstra ..................... 714/784 |
| 5,889,470 A | * | 3/1999 | Kaycee et al. ......... 340/825.07 |
| 5,892,768 A | * | 4/1999 | Jeng ............................ 370/445 |
| 5,970,066 A | * | 10/1999 | Lowry et al. ............... 370/353 |
| 6,052,380 A | * | 4/2000 | Bell ............................ 370/445 |

* cited by examiner

Primary Examiner—Douglas Olms
Assistant Examiner—Ken Vanderpuye
(74) Attorney, Agent, or Firm—Thomas, Kayden, Horstemeyer & Risley LLP (57) ABSTRACT

A circuit is provided for use in an interconnect node in a packet-switching communication network to facilitate data packet transmission between an Ethernet port and a DSL port, which are both external to the circuit. Firmware for the interconnect node is executed on a processor internal to the circuit. The circuit receives data packets, determines the packet type, tests the packet for corruption, and after some firmware processing, forwards the packet to its destination. The circuit also provides support for other parts of the interconnect node.

21 Claims, 9 Drawing Sheets

FIG. 1

FUNCTIONS BY BLOCK:

ARM_ENT
o ARM7TDMI CORE

ASB_ENT
o ARM BUS TO ASB BUS PROTOCOL CONVERSION
o INTERNAL SELECT SIGNAL(S) GENERATION
o INPUT DATA MUX FUNCTION FOR ARM7TDMI CORE

PERIPH_ENT
o UART
o TIMERS (2, GENERAL PURPOSE)
o WATCHDOG TIMER
o GPIO REGISTERS AND CONTROL
o INTERRUPT CONTROLLER (FOR INTERNAL AND EXTERNAL SORCES)

EBI_ENT
o EXTERNAL BUS INTERFACE CONTROL
o EXTERNAL BUS ARBITRATION LOGIC
o EXTERNAL CHIP SELECT GENERATION AND CONFIGURATION CONTROL
o WAIT STATE GENERATION
o BYTE/WORD ALIGNMENT LOGIC

DMA_ENT
o DSL TX/RX CHANNEL DMA ARBITRATION
o DMA CONTROL LOGIC
o ETHERNET PORT IPLUT SEARCH FUNCTION
o DSL PORT IPLUT SEARCH FUNCTION
o ETHERNET (UPSTREAM) IP PROCESSION
o DMA CONTROL REGISTERS

DSL_ENT
o HDLC CONTROL
o DSL (DOWNSTREAM) PPP/IP PROCESSING
o DSL CLOCK SYNCHRONIZATION
o DMA REQUEST LOGIC
o HDLC/PPP/IP CONTROL REGISTERS

DPRAM_ENT
o 8K BYTE (2K X 32) DUAL-PORT RAM
o LUT (3) CONTROL AND MAINTENANCE

CIRCUIT TO INTEGRATE A HOST PROCESSOR WITH SPECIAL PACKET-HANDLING LOGIC FOR USE WITH A DSL MODEM

CROSS REFERENCE TO RELATED APPLICATION

This document claims priority to and the benefit of the filing date of the copending and commonly assigned provisional application entitled AN ASIC TO INTEGRATE A HOST PROCESSOR WITH SPECIAL PACKET-HANDLING LOGIC FOR USE WITH A DSL MODEM, assigned Ser. No. 60/071,625, and filed Dec. 30, 1997, which is hereby incorporated by reference.

FIELD OF THE INVENTION

The present invention generally relates to packet-switching networks, and more particularly to an Application Specific Integrated Circuit (circuit) developed to function as part of an interconnect node in a packet-switching network to facilitate the receipt and transmission of data between a central office and remote users.

BACKGROUND OF THE INVENTION

In the field of data communications, a modem is used to communicate information from one location to another. Digital Subscriber Line (DSL) technology now enables modems, or other devices such as frame relay data service units (DSU's) to communicate rapidly large amounts of data. This communication scheme generally adheres to a model, known as the Open Systems Interconnect (OSI) Seven-Layer model. This model specifies the parameters and conditions under which information is formatted and transferred over a given communications network. A general background of the OSI seven layer model follows.

In 1978, a framework of international standards for computer network architecture known as OSI (Open Systems Interconnect) was developed. The OSI reference model of network architecture consists of seven layers. From the lowest to the highest, the layers are: (1) the physical layer; (2) the datalink layer; (3) the network layer; (4) the transport layer; (5) the session layer; (6) the presentation layer; and (7) the application layer. Each layer uses the layer below it to provide a service to the layer above it. The lower layers are implemented by lower level protocols which define the electrical and physical standards, perform the byte ordering of the data, and govern the transmission and error detection and correction of the bit stream. The higher layers are implemented by higher level protocols which deal with, inter alia, data formatting, terminal-to-computer dialogue, character sets, and sequencing of messages.

Layer 1, the physical layer, controls the direct host-to-host communication between the hardware of the end users' data terminal equipment (e.g., a modem connected to a PC).

Layer 2, the datalink layer, generally fragments the data to prepare it to be sent on the physical layer, receives acknowledgment frames, performs error checking, and re-transmits frames which have been incorrectly received.

Layer 3, the network layer, generally controls the routing of packets of data from the sender to the receiver via the datalink layer, and it is used by the transport layer. An example of the network layer is Internet Protocol (IP) which is the network layer for the TCP/IP protocol widely used on Ethernet networks. In contrast to the OSI seven-layer architecture, TCP/IP (Transmission Control Protocol over Internet Protocol) is a five-layer architecture which generally consists of the network layer and the transport layer protocols.

The transport layer (Layer 4) determines how the network layer should be used to provide a point-to-point, virtual, error-free connection so that the end point devices send and receive uncorrupted messages in the correct order. This layer establishes and dissolves connections between hosts. It is used by the session layer. TCP is an example of the transport layer.

Layer 5, the session layer, uses the transport layer and is used by the presentation layer. The session layer establishes a connection between processes on different hosts. It handles the creation of sessions between hosts as well as security issues.

Layer 6, the presentation layer, attempts to minimize the noticeability of differences between hosts and performs functions such as text compression and format and code conversion.

Layer 7, the application layer, is used by the presentation layer to provide the user with a localized representation of data which is independent of the format used on the network. The application layer is concerned with the user's view of the network and generally deals with resource allocation, network transparency and problem partitioning.

The communications networks that operate within the OSI seven layer model include a number of paths or links that are interconnected to route voice, video, and data (hereinafter collectively referred to as "data") traffic from one location of the network to another. At each location, an interconnect node couples a plurality of source nodes and destination nodes to the network. In some cases, the sources and destinations are incorporated in a private line network that may include a series of offices connected together by leased-lines with switching facilities and transmission equipment owned and operated by the carrier or service provider and leased to the user. This type of network is conventionally referred to as a circuit-switching network. Accordingly, a source node of one office at one location of the network may transmit data to a destination node of a second office located at another location of the network through their respective switching facilities.

At any given location, a large number of source nodes may desire to communicate through their respective switching facilities, or interconnect nodes, to destination nodes at various other locations of the network. The data traffic from the various source nodes is first multiplexed through the source switching facility, then demultiplexed at the destination switching facility and finally delivered to the proper destination node. A variety of techniques for efficiently multiplexing data from multiple source nodes onto a single circuit of the network are presently employed in private line networks. For instance, time division multiplexing ("TDM") affords each source node full access to the allotted bandwidth of the circuit for a small amount of time. The circuit is divided into defined time segments, with each segment corresponding to a specific source node, to provide for the transfer of data from those source nodes, when called upon, through the network.

Other data communications systems, in contrast, have not been as successful employing multiplexing techniques to enhance network efficiency further. In particular, frame-relay networks offer far fewer alternatives than their circuit-switching network counterparts. Frame-relay networks are often referred to as packet-switching networks. Packet-switching networks, as opposed to circuit-switching networks, allow multiple users to share data network facilities and bandwidth rather than providing a specific amount of dedicated bandwidth to each user, as in TDM. Instead, packet switches divide bandwidth into connectionless, virtual circuits. As is known, virtual circuit bandwidth is consumed only when data are actually transmitted. Otherwise, the bandwidth is not used. In this way, packet-switching networks essentially mirror the operation of a statistical multiplexer (whereby multiple logical users share a single network access circuit). Frame relay operates within layer 2 (the data link layer) of the OSI model, and is an improvement over previous packet switching techniques, such as X.25, in that frame relay requires significantly less overhead.

Frame relay networks transport data packets by compressing and then transporting the packets over the communications channel. The communications channel can be provided by, for example, an ISDN (Integrated Services Digital Network) connection, however, other physical connections may be employed to transport frame relay data.

Frame relay is one of a series of data link protocols that fall within the broader class of data link protocols known as High-Level Data Link Control (HDLC). Typically, the frame relay data to be compressed and transported is packetized into standard High-Level Data Link Control—Unnumbered Information (HDLC-UI) Frame Relay packets, in accordance with the Internet Engineering Task Force (IETF) Request for Comment (RFC) 1490. RFC 1490 defines the format of standard HDLC-UI frame relay packets. These standard packets are then compressed and transported over the frame relay network.

The proliferation of frame relay technology led to the creation and provision of frame relay service networks by service providers. As is known, a frame relay service provided network effectively comprises a mesh of interconnected nodes that can be variably configured to provide a communication path between a plurality of end points. A geographically dispersed corporate enterprise may intercommunicate using frame relay technology by purchasing from the service provider what are known as permanent virtual circuits. A permanent virtual circuit is a configuration of various intermediate nodes in the frame relay service network which are dedicated to direct communications between a first end point and a second end point along a particular path. The service provider will typically establish permanent virtual circuits, within a frame relay network, in a way that evenly distributes data traffic and minimizes traffic congestion. Therefore, as additional users/communicating end points are added to the frame relay service network, the service provider may alter or otherwise reconfigure various permanent virtual circuits. However, it will communicate any such changes to the users at the end points.

Data link connection identifiers (DLCI's) are numbers that identify the various intermediate nodes between end points of a frame relay communication link. DLCI's identify the various intermediate nodes and therefore identify the particular communication path between end points. As is known, the provision of permanent virtual circuits simplifies the error control mechanisms for data transport utilizing frame relay technology, as opposed to communication links which are based on IP addresses and routers (where the communication path may vary from packet to packet).

An interconnect node in a packet-switching network functions as a mini-router to pass packets of data along a communication path between end points. A practical application of an interconnect node is in a DSL modem receiving and transmitting data packets between an Ethernet port and a DSL port. Such modems typically use microprocessors to perform the tasks associated with receiving, processing, and transmitting the data packets. Accordingly, these tasks are typically performed in software.

One shortcoming with this approach relates to the overhead, and therefore time, associated with software processing. Significantly, microprocessor/software control limits communication rates through data ports, as well as having higher latency. In systems that demand high speed communication, this is a significant drawback.

Accordingly, there is a need to address this and other related shortcomings in the art, by providing a system to perform the tasks associated with receiving, processing and transmitting data packets between an Ethernet port and a DSL port in a packet-switching network, at high communication rates.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a circuit used to integrate a host processor with special packet-handling logic, for use with a DSL modem. In a preferred embodiment of the invention, the circuit is implemented in an Application Specific Integrated Circuit (ASIC). The circuit facilitates data packet transmission between an Ethernet port and a DSL port, which are both external to the circuit. Firmware for the DSL Network Service Node (NSN) is executed on a processor internal to the circuit. In the preferred embodiment, the processor is embedded in the ASIC. The circuit receives data packets, determines the packet type, tests the packet for corruption, and after some firmware processing, forwards the packet to its destination. The circuit also provides support for other parts of the NSN, including LEDs, a serial port, Ethernet port, DMA control, and the network interface transceiver including HDLC controllers and elastic I/O.

More specifically, the circuit of the present invention may be used in the design of a DSL NSN as follows: the NSN functions as a micro-router, passing packets of data between an Ethernet port and a DSL port. As a micro-router, the NSN requires some Internet Protocol (IP) routing capability. The NSN passes IP packets encapsulated in Point-to-Point Protocol (PPP) packets from the DSL interface to the Ethernet interface, checking the IP header along the way to verify the routing path. The NSN supports the Simple Network Management Protocol (SNMP), which is the application protocol offering network management services in the Internet suite of protocols, and thus some of the IP packets may be destined for the NSN itself.

The circuit processes data packets in both the upstream (transmitting on the DSL port) and downstream (receiving on the DSL port) directions. In the upstream path, firmware controls the transfer of data packets from the Ethernet interface device, prepares the packets of PPP delivery, and commands the upstream packet delivery hardware to deliver the packet. In the downstream path, hardware functions preprocess the packets automatically prior to involving the firmware. Incoming packets are tested for packet type and tested for corruption. If firmware has successfully established a PPP link on the DSL connection, then IP packets are allowed. IP packets are tested for corruption, and the source and destination addresses are tested against a list of illegal addresses. Finally, the received destination IP address is compared to IP addresses contained in a firmware-maintained IP lookup table (LUT) within the circuit's internal Dual Port Random Access Memory (DPRAM). Valid packets are placed in memory, and firmware is notified to continue processing of the received packet. Firmware will then encapsulate the packet for Ethernet delivery, and command the Ethernet device to transmit the packet.

The circuit provides most of the functions of the NSN, with the exception of interface devices required to connect to Ethernet and the DSL interface. The circuit provides a significant improvement over software intensive designs by performing hardware preprocessing of data packets received in both the upstream and downstream data directions. This ensures that firmware's involvement in processing packets is limited to packets that have already been determined to be valid (i.e., error free) by the circuit's pre-processing circuitry. The circuit discards packets containing errors, without firmware intervention, and hardware counters are maintained for the error conditions detected by the circuit.

Other objects, features, and advantages of the present invention will become apparent to one with skill in the art upon examination of the drawings and the following detailed description. All such additional objects, features and advantages are intended to be included herein within this disclosure.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DESCRIPTION OF THE PREFERRED EMBODIMENT

Figure 1:
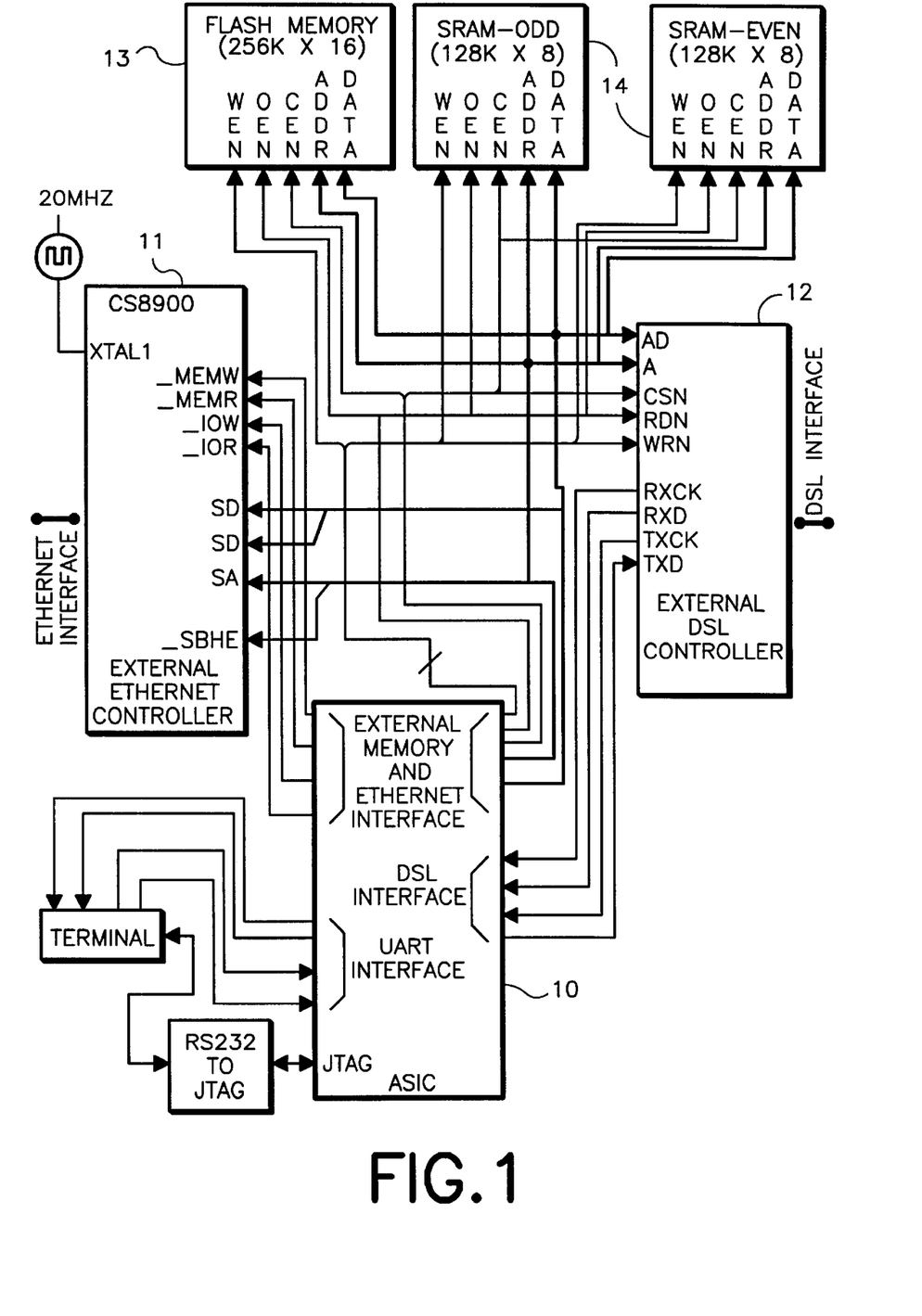
FIG. 1 is a simplified schematic diagram illustrating the interconnection of an embodiment of the circuit in accordance with the present invention with an external Ethernet interface, an external digital subscriber line (DSL) interface and external memory into a Network Service Node (NSN)
Figure 2A:
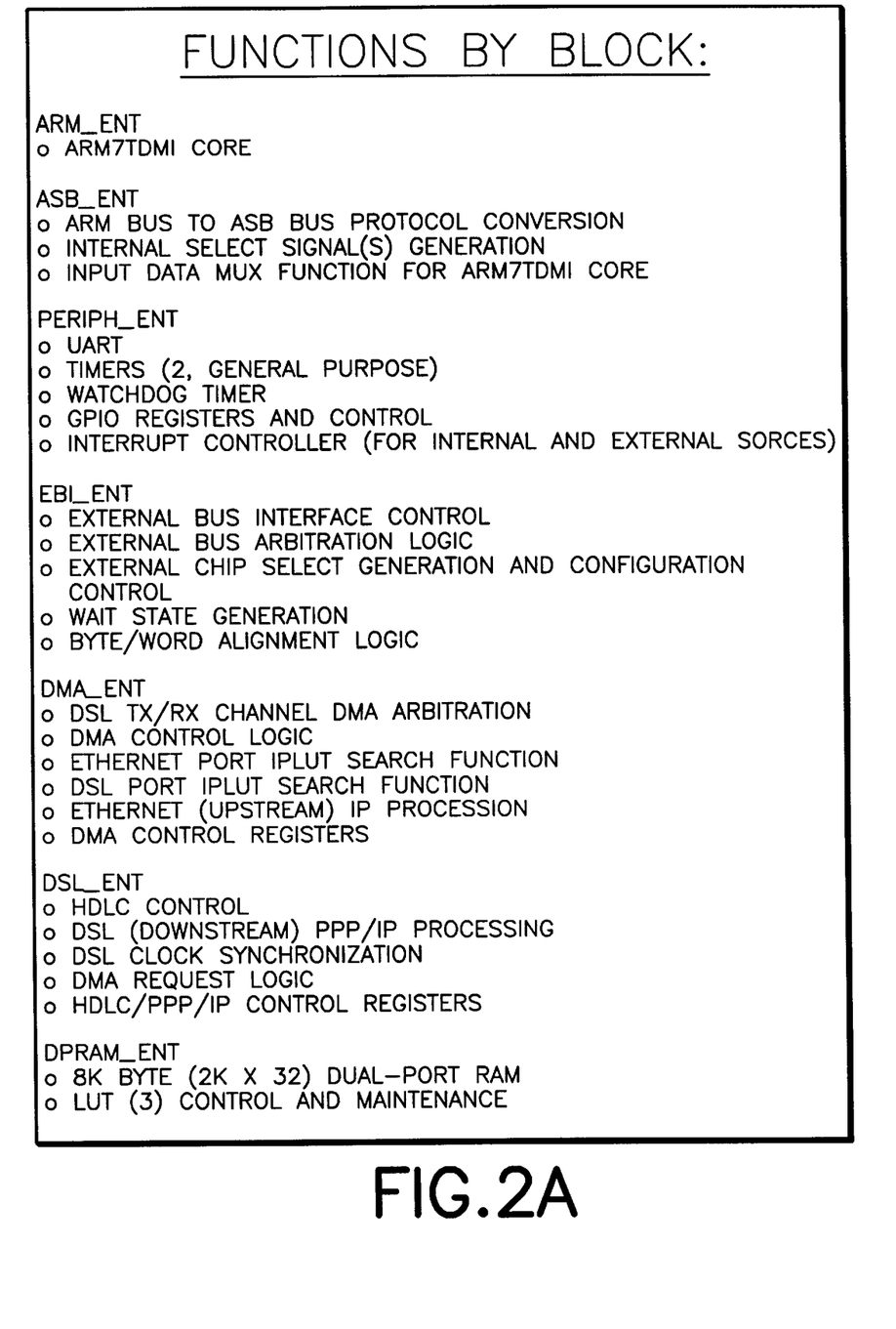
FIG. 2 is a detailed schematic diagram illustrating the internal functional blocks of the circuit depicted in FIG. 1.
Figure 2B:
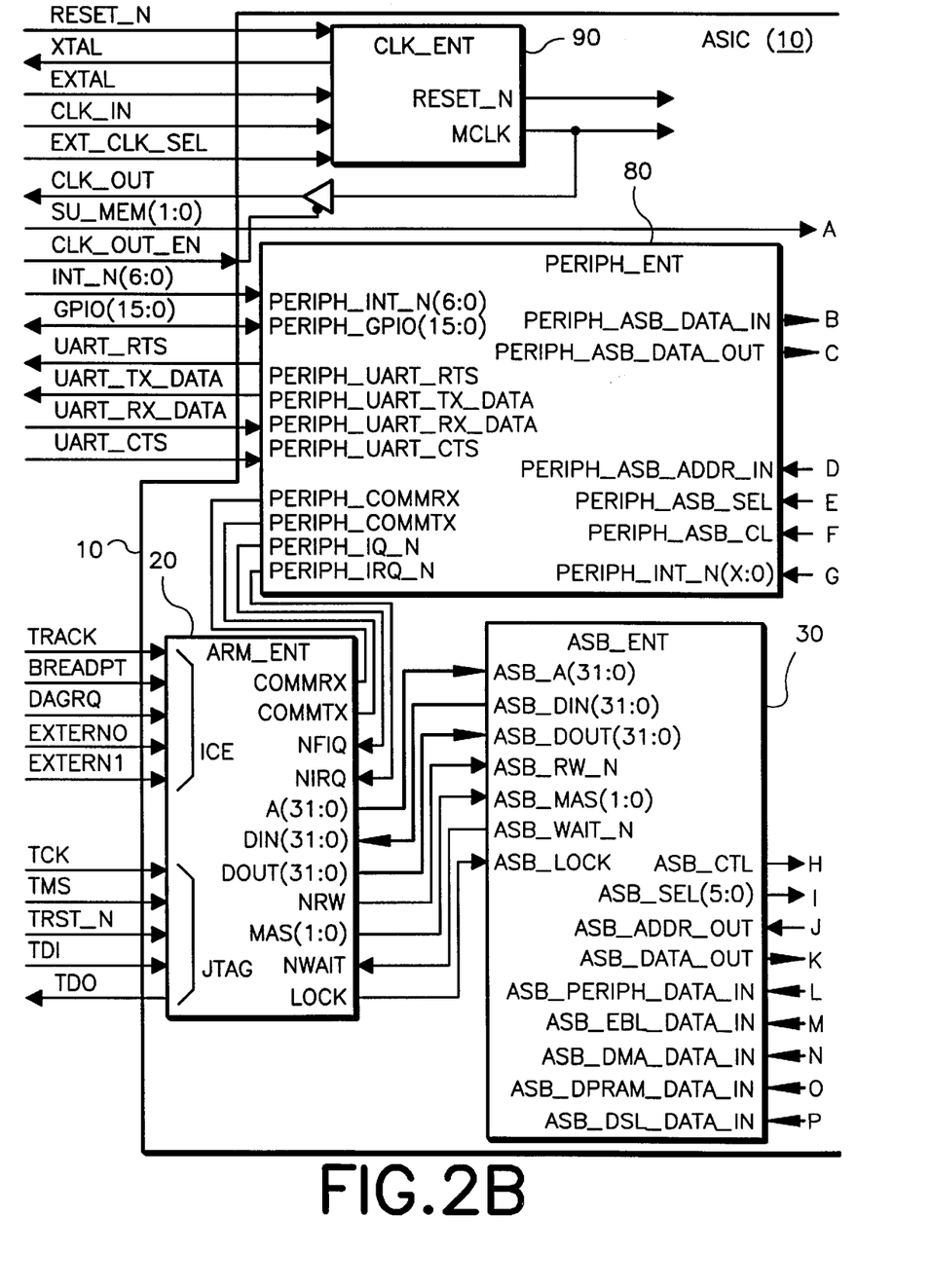
Figure 2C:
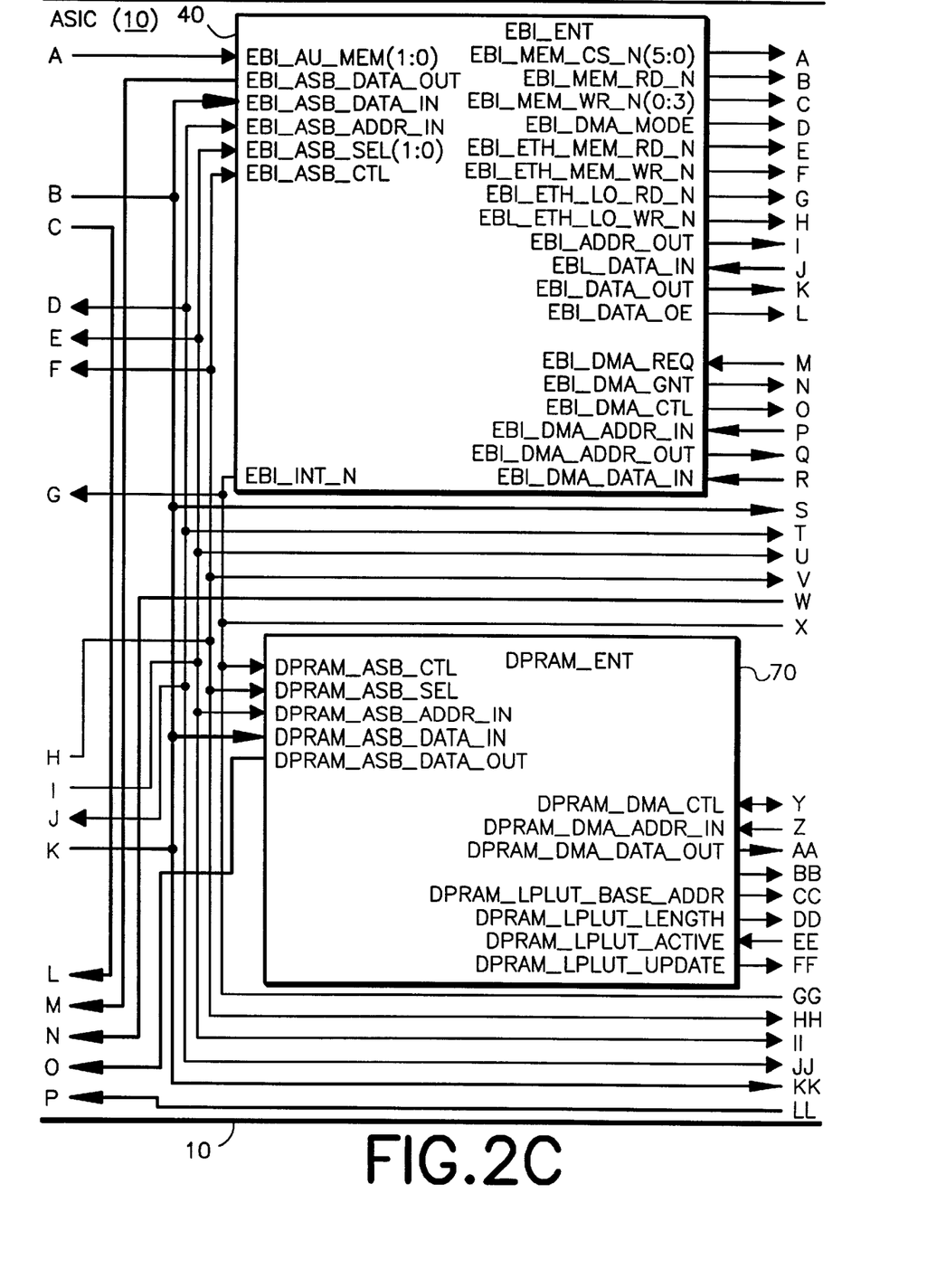
Figure 2D:
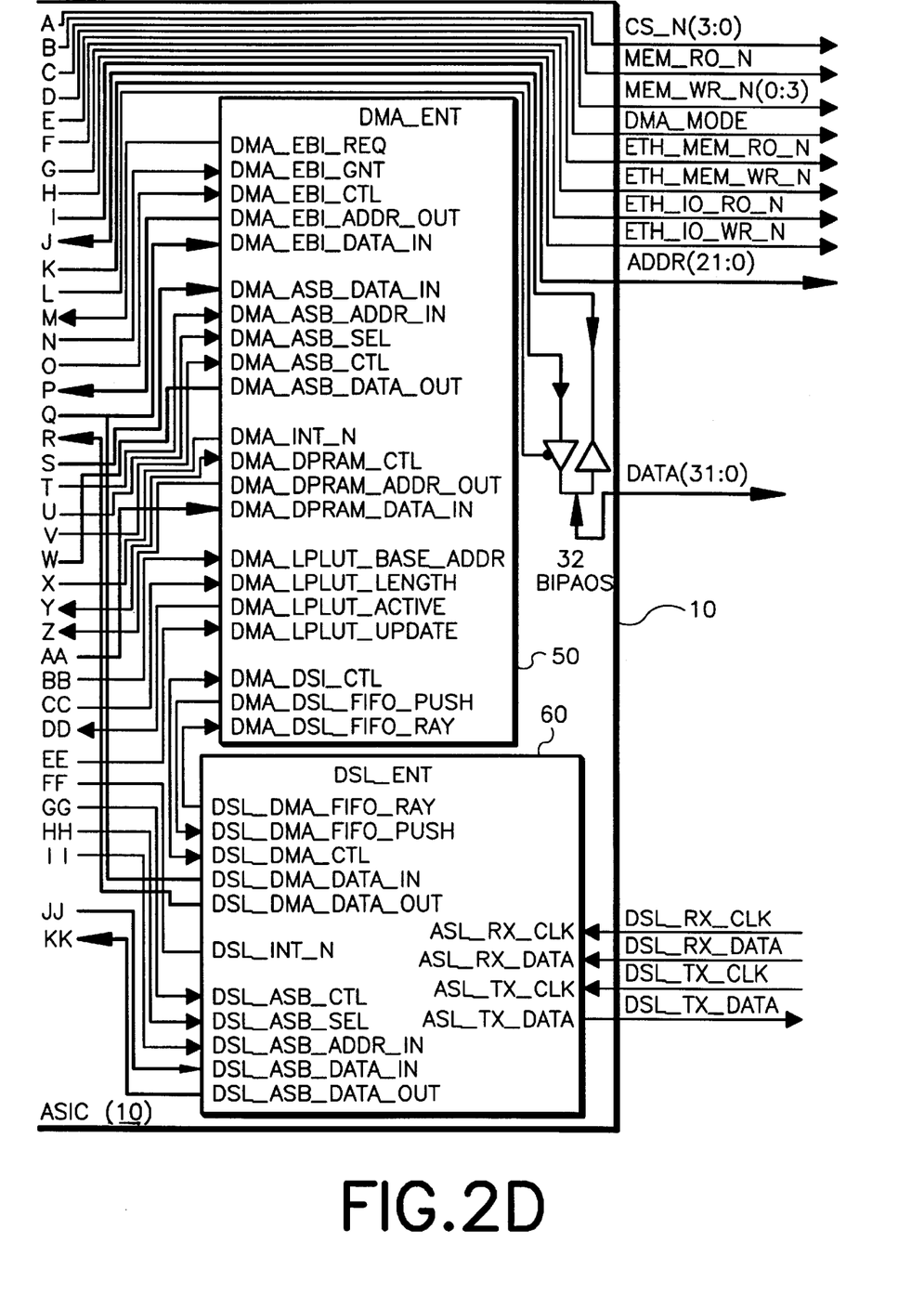

With reference now to the drawings, wherein like reference numerals designate corresponding parts throughout the several views, FIG. 1 illustrates an embodiment of a circuit 10 in accordance with the present invention. The circuit 10 is interconnected with an external Ethernet controller 11, an external DSL controller 12, and external memory 13, 14 to form an interconnect node in a frame relay network.

The circuit architecture of an embodiment of the circuit 10 of the present invention is shown in FIG. 2. This diagram outlines the major functional blocks within the circuit as well as the interconnection between the functional blocks. The major functional blocks of the circuit are the:

ARM_ENT=the ARM processor block 20.
ASB_ENT=the ARM System Bus (ASB) interface block 30.
EBI_ENT=the External Bus Interface (EBI) block 40.
DMA_ENT=the Direct Memory Access (DMA) functional block 50.
DSL_ENT=the Digital Subscriber Line (DSL) interface block 60.
DPRAM_ENT=the Dual-Port RAM functional block 70.
PERIPH_ENT=the peripherals functional block 80.
CLK_ENT=the clock control block 90.

Each of the functional blocks will be described below

1. ARM Processor Block

The ARM processor block 20 contains the circuit's processor core, which in a preferred embodiment is an ARM7TDMI RISC manufactured by Advanced RISC Machines™. This functional block is limited to only the processor core itself. All logic associated with interfacing to the processor core is contained in the other major functional blocks within the circuit. In a preferred embodiment of the invention, the processor core includes the following features:

32-bit RISC processor core.
32-bit performance at 16-bit system costs with an industry-leading MIPS/Watt.
Two instruction sets:
    ARM high-performance 32-bit instruction set.
    Thumb high-code-density 16-bit instruction set.
Von Neumann load/store architecture:
    Single 32-bit data bus for instructions and data.
3-stage pipeline architecture:
    Fetch, decode and execute stages.
8-, 16- and 32-bits data types:
    Support for big and little endian.
Single-cycle 32×8 hardware multiplier:
    Multiplication is accelerated when upper bytes are all zero or one.
32-bit register bank.
32-bit ALU
32-bit shifter
32-bit addressing, so no paging required above 64 kB.
32×8 DSP multiplier, for signal processing.

Small die area <4.5 mm², for integration in system products.

On-chip JTAG Debug and In Circuit Emulation.

2. ARM System Bus (ASB) Block

The ASB block 30 contains the logic required to interface the processor core 20 to all other functional blocks within the circuit. The ASB logic is responsible for generating the internal select signals for each functional block based on decoding the address that is driven by the processor core 20 for each memory-mapped operation. The ASB interface is designed to optimize the performance of memory read operations, both from the internal dual-port RAM 70 as well as from external memory devices 13, 14. The ASB block 30 interfaces to the EBI block 40 for all external bus operations.

The ASB block is the sole master of the ASB bus in the circuit. The ASB bus slaves consist of the EBI 40, DMA 50, DSL 60, DPRAM 70, and PERIPH 80 functional blocks (each of which are discussed below). The ASB block 30 generates an individual block select signal for each read/write processor cores operation and registers the processor core address bus for each memory-mapped operation.

Write operations to all circuit internal registers occur with no wait states required. Wait states for writes to the DPRAM and External Bus Interface are determined by the DPRAM 70 and EBI 40 blocks.

For reads, the ASB block contains a multiplexer function for steering all possible data sources into the processor core. Read operations to all circuit internal registers occur with no wait states required. Read operations from the circuit internal DPRAM have zero (0) wait state operations. Wait states for reads from the External Bus Interface are determined by the EBI block 40.

3. External Bus Interface (EBI) Block

The EBI block 40 contains the main interface logic that allows the circuit to communicate with all external memory-mapped devices. The EBI implements a non-multiplexed address and data bus. The EBI controls all accesses to the circuit's memory-mapped interface including all DMA operations that are required for both upstream and downstream packet movement to/from memory via arbitration logic.

The arbitration logic in the EBI block implements a round-robin arbitration mode where one DMA operation is allowed for every ARM read/write access. A second-level round robin arbiter is contained in the DMA block to determine which of the four different DMA controllers can arbitrate with the processor for a given memory operation. The EBI arbiter will be designed such that the processor has access to the external memory bus by default.

For ARM performance reasons, the EBI logic is optimized for high speed ARM memory read operations. The access performance for all other memory-mapped operations though the EBI block is given second priority, where required, in order to maintain the highest possible access speed for ARM memory read operations.

The EBI generates six general-purpose programmable chip selects, CS(5:0), as well as interface signals specifically designed to interface to an Ethernet controller external to the circuit, such as the Crystal CS8900 Ethernet Controller.

The Ethernet Controller interface is designed specifically for communications with the chosen Ethernet controller, which in a preferred embodiment is the Crystal CS8900 Ethernet Controller. In contrast with the general-purpose chip selects, which are individually active simultaneously with either the memory read (MEM_RD_N) or memory write (MEM_WR_N) signals, the interface logic generates read or write signals to the Ethernet controller's memory or input/output (ETH_MEM_RD_N; ETH_MEM_WR_N; ETH_IO_RD_N; ETH_IO_WR_N), but no chip select.

Each of the six chip selects has a programmable cycle extend field that allows the user to configure the number of system clocks that memory-mapped reads and writes will take to complete. A value of zero in the cycle extend field corresponds to the minimum number of processor wait states allowed which may be constrained above zero wait states if desired.

The general-purpose chip selects also have a 'size' field which allows each chip select to be individually configured to operate with 8, 16 or 32-bit memory mapped devices. In cases where the data to be read/written is wider than the data width of the device connected to a given chip select, the EBI interface logic performs multiple operations autonomously in order to read/write the correct amount of data. For example, if the ARM processor requests a 32-bit instruction fetch from a device having a chip select configured for 16-bit data width, the EBI logic will perform two consecutive reads and then present the entire 32 bits of data to the ARM processor at once. The EBI logic will perform the similar dynamic bus sizing for each chip select whether or not the memory request originated from the ARM processor or from a DMA request.

4. Direct Memory Access (DMA) Block

Figure 3:
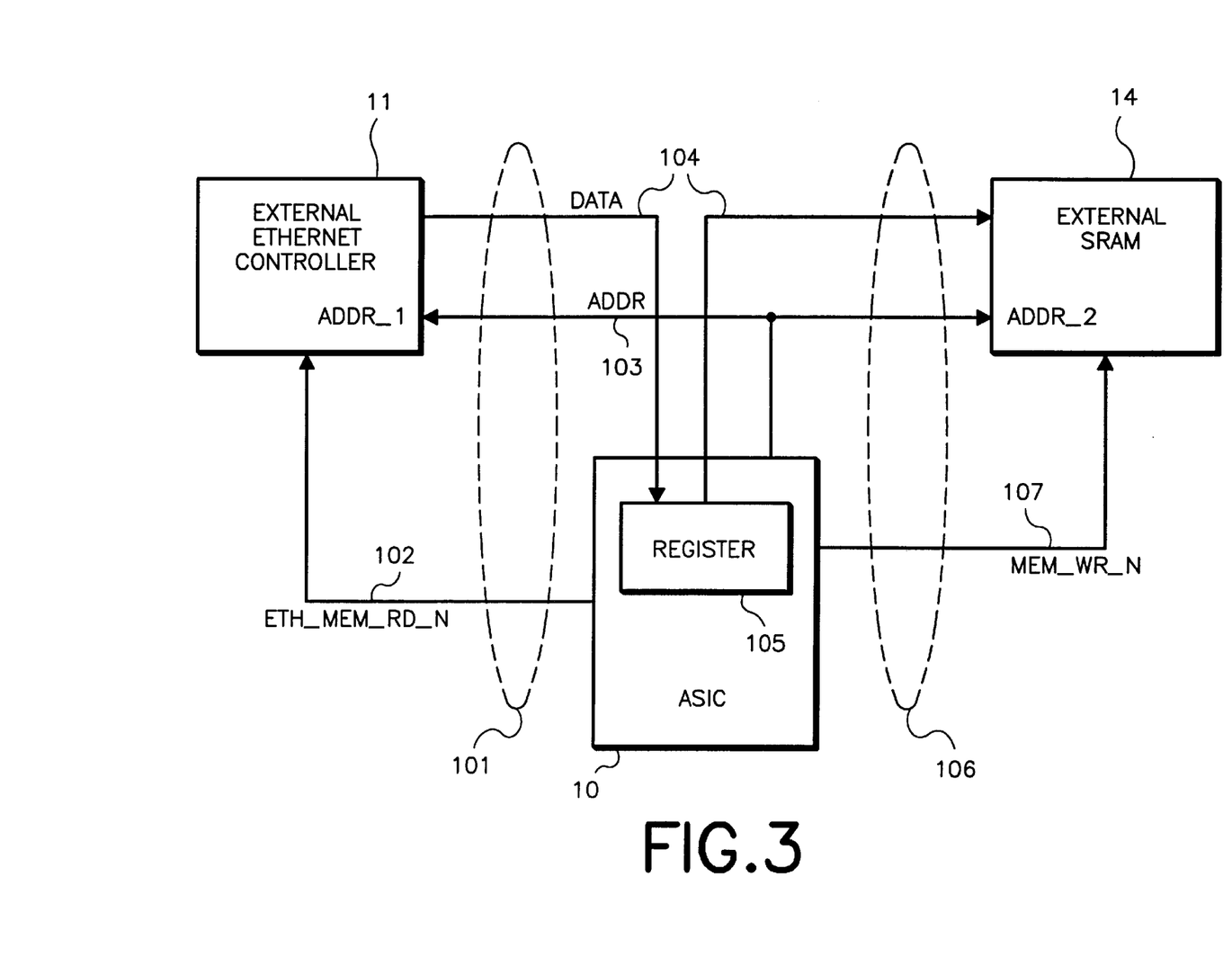
FIG. 3 is a simplified block diagram illustrating the movement of data from an external Ethernet controller, through the circuit depicted in FIGS. 1 and 2, to an external memory device, in accordance with the present invention.
Figure 4:
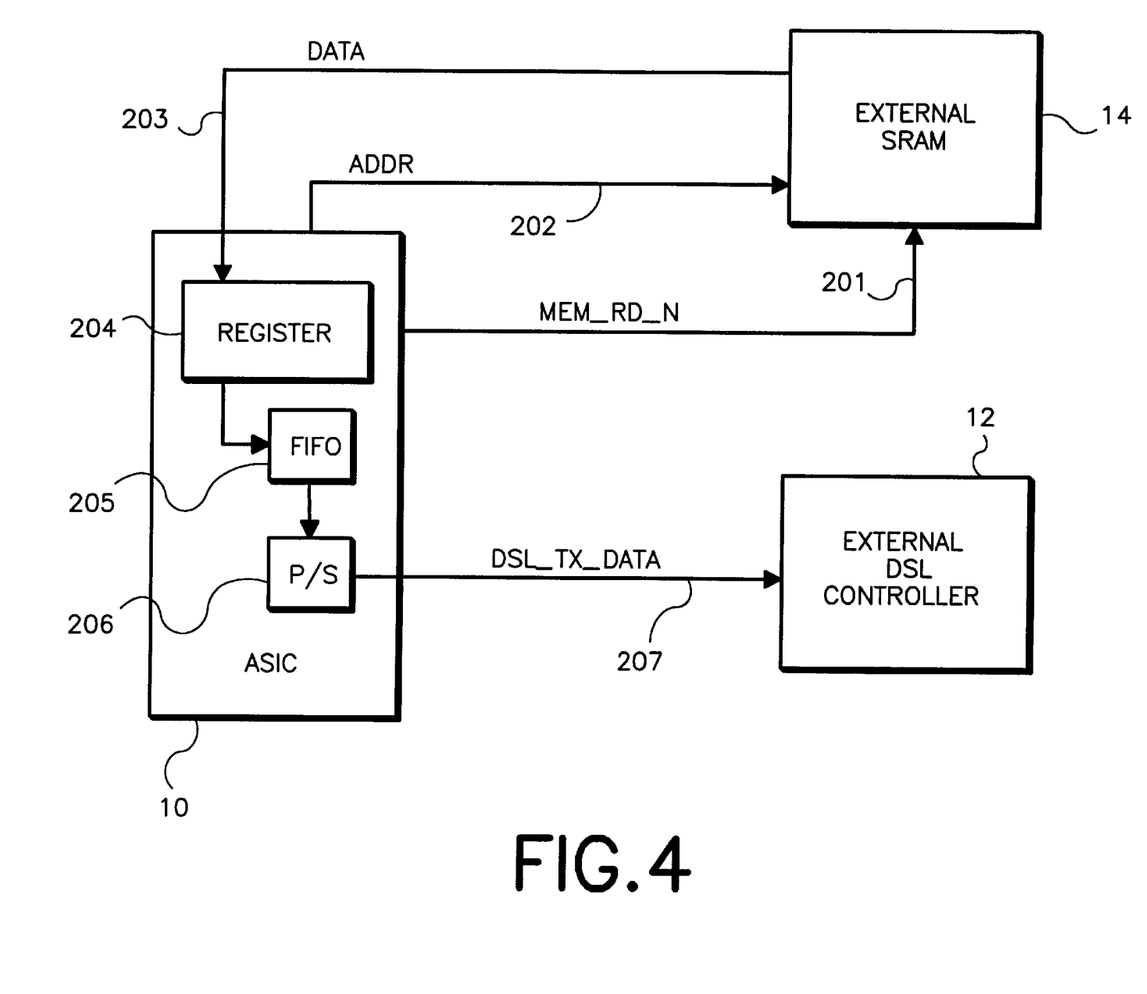
FIG. 4 is a simplified block diagram, similar to FIG. 3, illustrating the movement of data from an external memory device, through the circuit depicted in FIGS. 1 and 2, to an external DSL interface, in accordance with the present invention.
Figure 5:
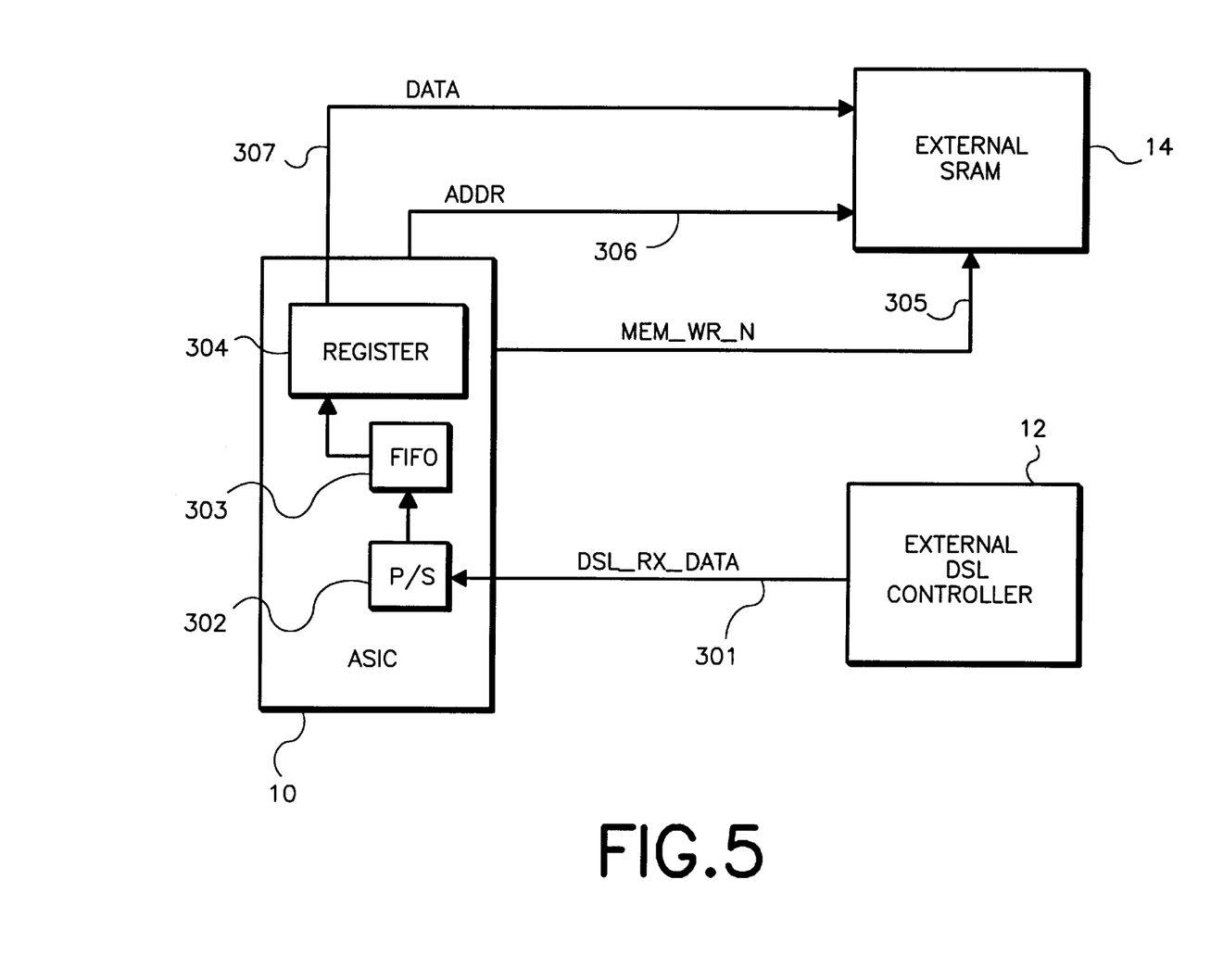
FIG. 5 is a simplified block diagram similar to FIG. 3, illustrating the movement of data from an external DSL interface, through the circuit depicted in FIGS. 1 and 2, to an external memory device, in accordance with the present invention.
Figure 6:
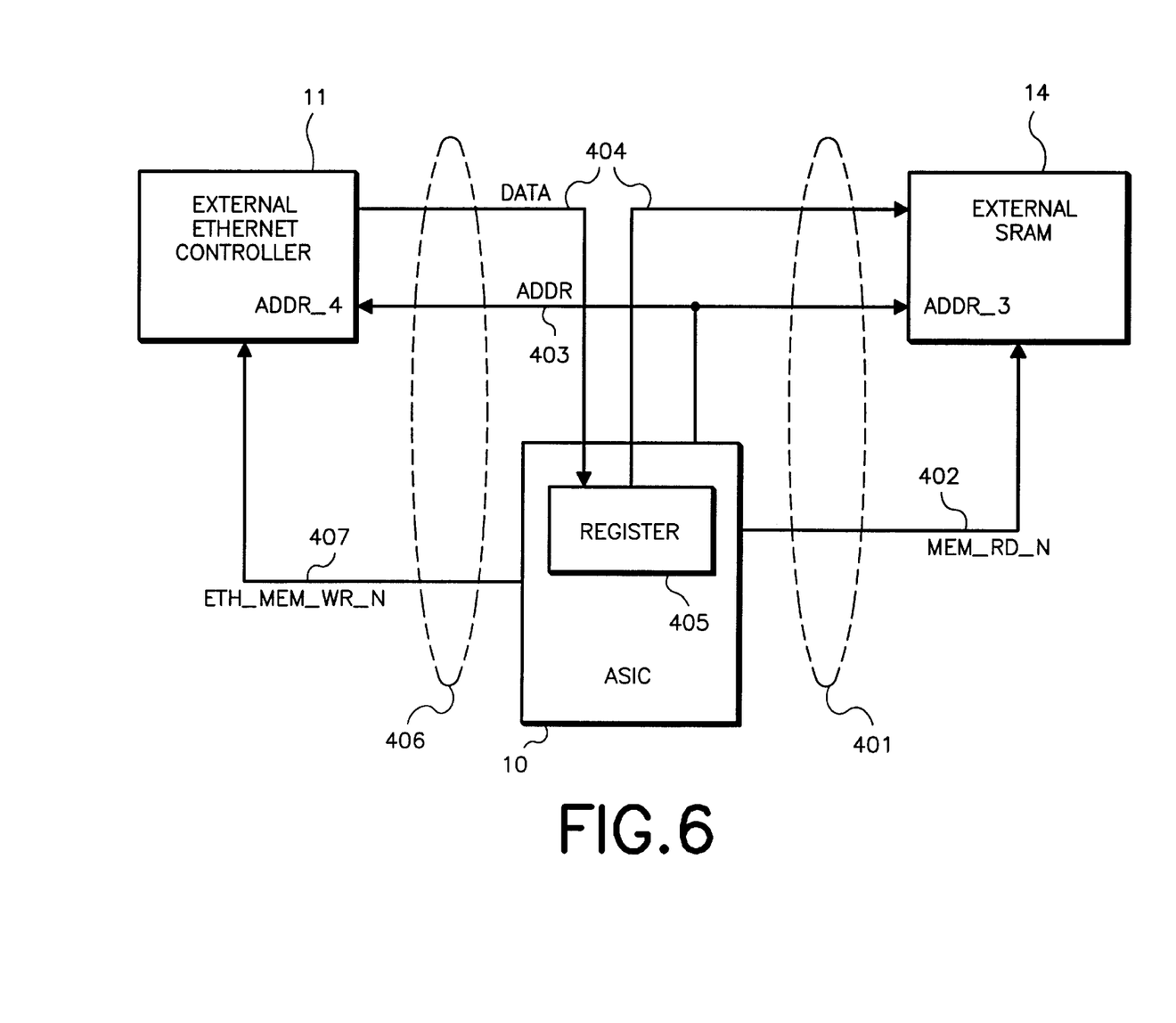
FIG. 6 is a simplified block diagram illustrating the movement of data from an external memory device, through the circuit depicted in FIGS. 1 and 2, to an external Ethernet interface, in accordance with the present invention.

The DMA block 50 contains four independent DMA controllers, two of which are dedicated for moving data from the Ethernet controller, through the circuit, to the DSL controller (i.e., "upstream" data movement as depicted in FIGS. 3 and 4), and two of which are dedicated for moving data from the DSL controller, through the circuit, to the Ethernet controller (i.e., "downstream" data movement as depicted in FIGS. 5 and 6.

With reference to FIGS. 1, 3, 4, 5 and 6, the DMA controllers can be more specifically defined as:

Upstream receive—for use in moving data from the Ethernet controller 11 into external SRAM 14 (shown in FIG. 3).

Upstream transmit—for use in moving data from external SRAM 14 to the transmit port of the DSL controller 12 (shown in FIG. 4).

Downstream receive—for use in moving data from the receive port of the DSL controller 12 into external SRAM 14 (shown in FIG. 5).

Downstream transmit—for use in moving data from external SRAM 14 to the Ethernet controller 11 (shown in FIG. 6).

All four DMA controllers are configured and started via firmware control. Each DMA controller implements a linked-list method of DMA operation. Each DMA operation consists of a 32-bit data transfer. If the circuit is connected to a 16-bit device, the circuit will automatically perform two consecutive 16-bit operations in order to move data on a 32-bit boundary.

Once started via firmware, the transmit channel DMA controllers operate independently based on information contained in the linked-list buffer descriptors, which are contained in external SRAM. Firmware is responsible for setting up the buffer descriptors for a DMA controller before the individual DMA channel is started.

In contrast to the transmit DMA controllers, the receive DMA controllers will operate based on a combination of external stimulus and firmware control. The upstream receive DMA controller will perform DMA operations in response to a firmware command, after firmware has interrogated the Ethernet controller on a per-frame basis. The downstream receive DMA controller performs DMA operations in response to requests from the DSL interface logic as serial data is received and buffered from the DSL receive port.

Since all four of the DMA channels operate independently, the DMA logic includes arbitration logic to determine which DMA controller can request access to the circuit's external memory interface. The DMA block 50 implements a round-robin arbiter and the winner of this arbitration asserts a request to the EBI block 40. The EBI arbiter will then arbitrate between ARM processor external memory requests and the winner of the DMA second-level arbitration to determine who ultimately gets access to the external memory interface. If the DMA channel has been granted access to the external memory interface, the DMA block will be the source of control for the external memory interface control signals (MEM_RD_N; MEM_WR_N; ETH_MEM_RD_N; ETH_MEM_WR_N; ETH_IO_RD_N; ETH_IO_WR_N). The EBI logic will multiplex control of these signals over to the DMA block based on the DMA block winning the external interface arbitration with the ARM processor. The DMA interface logic will assert the necessary external memory interface control signals to move the data to/from the selected DMA controller.

FIG. 3 shows a simplified block diagram for the data flow for an upstream receive DMA operation. Upstream receive DMA operations require the DMA logic to move data from the Ethernet controller 11 to the external SRAM 14. To accomplish this two steps are required. In the first step 101 (Ethernet memory read), the DMA logic sends a memory read signal 102 (ETH_MEM_RD-N) and the appropriate address 103 (ADDR) to the Ethernet controller 11 and moves a 32-bit data word 104 (DATA) consisting of two 16-bit half-words from an address (ADDR_1) in the Ethernet controller 11 into an internal 32-bit circuit register 105.

In the second step 106 (SRAM memory write), the DMA logic sends a memory write signal 107 (MEM_WR_N) to the external SRAM memory 14, and moves the 32-bit word 104 (DATA) from the circuit's internal data register 105 into the external SRAM 14. If the external SRAM is only 16-bits wide, then the circuit must perform two consecutive 16-bit half-word writes to move the 32-bit word into SRAM. Each 16-bit half-word read from the Ethernet controller 11 is accompanied by the valid address for the Ethernet controller's receive buffer (ADDR_1). Since the address driven to the external SRAM during step two 106 (memory write) is typically a different address than the Ethernet controller 11 needs to see during the memory read operation, the circuit 10 must register the data from the Ethernet controller 11 so that the address line 103 (ADDR) can be changed to provide the appropriate address for the write operation to the external SRAM 14 (ADDR_2).

FIG. 4 shows a simplified block diagram, similar to FIG. 3, for the dataflow for an upstream receive DMA operation. Upstream transmit DMA operations require the DMA logic to send a memory read signal 201(MEM_RD_N) and the appropriate address 202 (ADDR) to the external SRAM 14 to move data 203 (DATA) from the external SRAM 14 into an internal circuit data register 204. Once the data word is registered internally, the word is moved into the DSL block's transmit FIFO 205 and then into a parallel to serial converter 206, where it is serialized and then sent out as a serial data signal 207 (DSL_TX_DATA) to the external DSL controller 12.

FIG. 5 shows a simplified block diagram, similar to FIG. 3, for the data flow for a downstream receive DMA operation. Downstream receive DMA operations occur as a result of incoming serial data 301 (DSL_RX_DATA) received from the external DSL controller 12. After being received, the serial data 301 is converted to 32-bit parallel data by a serial to parallel converter 302 and buffered in the DSL block's receive FIFO 303. The downstream receive DMA controller will request access to the external memory interface, via the circuit's EBI arbitration logic, for each 32-bit word stored in the DSL receive FIFO 303. Once access to the external memory interface is granted, the word is shifted from the FIFO 303 to register 304, a memory write signal 305 (MEM_WR_N) and the appropriate address 306 (ADDR) are sent to the external SRAM 14, and the circuit 10 performs the necessary number of memory writes to move the 32-bit data word 307 (DATA) from internal register 304 into external SRAM 14.

FIG. 6 shows a simplified block diagram, similar to FIG. 3, for the data flow for an downstream transmit DMA operation. Downstream transmit DMA operations require the DMA logic to move data from external SRAM 14 to the Ethernet controller 11. To accomplish this two steps are required. In the first step 401 (SRAM memory read), the DMA logic sends a memory read signal 402 (MEM_RD_N) and the appropriate address 403 (ADDR) to the external SRAM 14 and moves a single 32-bit data word 404 (DATA) from an address (ADDR_3) in the external SRAM 14 into an internal circuit register 405. If the circuit 10 is connected to a 16-bit SRAM, two consecutive 16-bit data reads will be performed to move the 32-bit word into the circuit's 10 internal register 405.

In the second step 406 (Ethernet memory write), the DMA logic sends a memory write signal 407 (ETH_MEM_WR_N) to the Ethernet controller 11 and the 32-bit data word 404 (DATA) is moved from the circuit's 10 internal data register 405 into the Ethernet controller 11. Since the Ethernet controller is a 16-bit device, this DMA operation requires two 16-bit writes from the circuit to the Ethernet controller. Each 16-bit half-word written to the Ethernet controller must be accompanied by the valid address for the Ethernet controller's transmit buffer. Since the address driven to the external SRAM during step one 401 (SRAM memory read) is typically a different address than the Ethernet controller needs to see during a memory write operation, the circuit 10 must register the data from SRAM so that the address line 403 (ADDR) can be changed to provide the appropriate address for the write operation to the Ethernet controller (ADDR_4).

In addition to the data movement functions of each of the DMA controllers, two of the four controllers also implement Internet Protocol Lookup Table (IPLUT) search capabilities. Both the upstream receive and downstream receive DMA controllers use a common state machine that will search the IPLUT for a given IP destination address. Each DMA Controller finds the IP destination address in IP messages that it receives and passes it to the DMA IP Lookup Controller. The DMA IP Lookup Controller state machine operates independently from the DMA controllers with the restriction that only one IPLUT search can be performed at one time, either in the upstream or downstream direction, due to the fact that the state machine uses one common datapath to the IPLUT in the circuit's 10 internal DPRAM. The IPLUT search will be done concurrently while the downstream receive DMA channel is moving the received packet into external SRAM.

Additionally, during upstream receive DMA operations, the DMA logic will monitor each data word of an Ethernet packet that is moved from the Ethernet controller to the external SRAM and will preprocess the Ethernet packet for upstream dataflows.

Since the DMA block 50 performs both upstream and downstream IPLUT comparison functions, the DMA block contains arbitration logic to determine whether the upstream or downstream IPLUT function can have access to the circuit's internal DPRAM which contains the IPLUT. The DMA block 50 always performs a complete LUT search and comparison sequence for one data direction, even when simultaneous IPLUT sequences are needed in both data directions. In the event that simultaneous IP Lookup sequences are requested, the downstream data direction will have priority over the upstream data direction.

5. Digital Subscriber Line (DSL) Block

The DSL interface block 60 contains all of the control and datapath logic required to transmit and receive serial data via DSL ports. The DSL block includes the transmit and receive HDLC controllers, FIFO's, status and configuration registers, clock synchronization logic, DMA request logic, and the IP preprocessing functions for the downstream receive data path (excluding the IPLUT function).

The DSL block 60 receives both its transmit and receive serial clocks externally from the CAP chipset. The transmit and receive logic is immediately synchronized to the circuit's internal 40 MHz clock. Clock synchronization logic within the DSL block 60 guarantees that the DSL channels function properly at serial data rates up to 13.3 Mbps, assuming a 3× sampling rate for the synchronization logic. FIFO's may be used in both data directions to accommodate the difference between the serial data transfer rates and the rate in which data words are DMA'd to/from external packet SRAM. Preferably, the circuit 10 will not be designed to be able to use any of the internal SRAM for packet RAM.

The DSL block 60 generates DMA requests to the DMA block 50 for each 32-bit data word that needs to be read from or written to packet SRAM. The DMA block 50 will service each of the DMA requests from the DSL block 60.

6. Dual Port Random Access Memory (DPRAM) Block

The DPRAM block 70 contains the 4 k×32 DPRAM along with three LUT functions (two generic LUTs and the IPLUT) and arbitration logic needed to prevent simultaneous accesses from each port to the same DPRAM address. In addition to the LUT capability, the DPRAM 70 is used for fast access RAM for high-speed processing routines by the ARM processor block 20 (e.g., critical interrupt service routines). The baseline access time for the ARM processor 20 to read from the DPRAM 70 is zero wait states.

The primary port of the DPRAM 70 is used for ARM processor accesses and for maintenance of the three LUTs. Firmware is able to add, delete, and search for table entries via the primary port. The primary port is a read/write port. The secondary port of the DPRAM 70 is used by the DMA block 50 only, and is used to search the IPLUT as required during both upstream and downstream packet reception. The secondary port is a read-only port.

Arbitration logic is preferably contained in the DPRAM block 70 in order to guarantee the following:

A read on one port and a write on the other port to the same address never occur during the same clock cycle.

An IPLUT 'add entry' command received on the primary port will never modify the IPLUT while an IPLUT search is ongoing on the secondary port. The majority of the time spent during an IPLUT 'add entry' command will be the time it takes the logic to search the IPLUT to determine if the entry already exists in the table, which will consist entirely of read operations. This search function will be allowed to proceed on the primary port while an IPLUT search is ongoing on the secondary port. If it is determined, via the search on the primary port, that the entry should be added to the IPLUT, then the writes to the DPRAM 70 required to modify the LUT are held up until any ongoing IPLUT search completes on the secondary port.

An IPLUT 'delete entry' command received on the primary port does not modify the IPLUT while an IPLUT search is ongoing on the secondary port. The majority of the time spent during an IPLUT 'delete entry' command is the time it takes the logic to search the IPLUT to find the entry to be deleted, which consists entirely of read operations. This search function is allowed to proceed on the primary port while an IPLUT search is ongoing on the secondary port. Once the entry to be deleted is found, via the search on the primary port, then the writes to the DPRAM required to modify the LUT are held up until any ongoing IPLUT search completes on the secondary port.

7. Peripherals Block

The Peripherals block 80 contains the various general purpose peripherals needed to enhance the ARM processor firmware capability. The selection of general purpose peripherals within the circuit may be selected for a particular system and may include such peripherals as:

an Interrupt Controller a Watchdog Timer

General Purpose Timers a Universal Asynchronous Receive/Transmit (UART)

General Purpose I/O signals

All peripherals internal to the circuit are controlled and maintained via the ARM processor block 20.

8. Clock Control Block

The clock control block 90 simply provides the circuit 10 with an internal clock.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A circuit for an interconnect node in a packet-switching network, said circuit comprising:

a processor;

a first interface block comprising logic for interfacing said processor to other components within said circuit, said other components comprising:

a second interface block comprising logic for interfacing said circuit to an external Ethernet interface and an external memory;

a third interface block comprising logic for interfacing said circuit to an external DSL interface;

a memory access block comprising logic for receiving packets of data from the external Ethernet interface and moving said data packets to the external memory, transmitting packets of data from the external memory to the external DSL interface, receiving packets of data from the external DSL interface and moving said data packets to the external memory, and transmitting packets of data from the external memory to the external Ethernet interface; and an internal memory block comprising memory and arbitration logic to prevent reading and writing to an address during a single clock cycle.

2. The circuit of claim 1, further comprising a peripherals block.

3. The circuit of claim 1, wherein said processor is a RISC processor.

4. The circuit of claim 1, further comprising a clock control block for providing said circuit with an internal clock.

5. The circuit of claim 1, wherein the memory in said internal memory block is a Dual Port Random Access Memory (DPRAM).

6. The circuit of claim 1, wherein said memory access block includes arbitration logic.

7. The circuit of claim 1, wherein said circuit is a 0.5 micron CMOS device.

8. The circuit of claim 1 wherein the firmware for said interconnect node is executed on said processor.

9. The circuit of claim 1, wherein said data packets are IP packets.

10. The circuit of claim 2, wherein said peripherals block includes a UART port.

11. The circuit of claim 2, wherein said peripherals block includes a general purpose timer.

12. The circuit of claim 2, wherein said peripherals block includes a watchdog timer.

13. The circuit of claim 2, wherein said peripherals block includes general purpose I/O.

14. An application specific integrated circuit (ASIC) for an interconnect node in a packet-switching network, said circuit comprising:

means for receiving and transmitting data packets between an external Ethernet interface and an external DSL interface;

means for processing each data packet to ensure that the data packet is compatible with the external interface to which the data packet is transmitted;

means for interfacing said receiving and transmitting means and said processing means with a memory, said memory being internal to the circuit; and means for preventing the circuit from both reading and writing to a single address in the memory during a single clock cycle.

15. The circuit of claim 14, further comprising means for determining the packet type after receipt.

16. The circuit of claim 14, further comprising means for determining whether the packets of data are error-free.

17. The circuit of claim 16, further comprising means for discarding the packets of data that are determined to contain errors and transmitting only the packets of data that are determined to be error-free.

18. An application specific integrated circuit (ASIC) for an interconnect node in a packet-switching network, said circuit comprising:

means for receiving and transmitting data packets between an external Ethernet interface and an external DSL interface;

means for processing each data packet to ensure that the data packet is compatible with the external interface to which the data packet is transmitted;

means for interfacing said receiving and transmitting means and said processing means with a memory, said memory being external to the circuit; and means for preventing the circuit from both reading and writing to a single address in the memory during a single clock cycle.

19. The circuit of claim 18, further comprising means for determining the packet type after receipt.

20. The circuit of claim 18, further comprising means for determining whether the packets of data are error-free.

21. The circuit of claim 20, further comprising means for discarding the packets of data that are determined to contain errors and transmitting only the packets of data that are determined to be error-free.

* * * * *